(12) United States Patent
Harkin et al.

(10) Patent No.: US 8,005,926 B2
(45) Date of Patent: Aug. 23, 2011

(54) TIERED WEB SITE WITH WEB-TIER ADMISSION CONTROL BASED ON UTILIZATION DATA GENERATED ON APPLICATION TIER

(75) Inventors: Arthur S. Harkin, San Jose, CA (US); Fu-Tai Shih, San Jose, CA (US); Gita Murthy, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1772 days.

(21) Appl. No.: 11/169,971

(22) Filed: Jun. 29, 2005

(65) Prior Publication Data
US 2005/0254422 A1    Nov. 17, 2005

Related U.S. Application Data

(63) Continuation-in-part of application No. 09/916,101, filed on Jul. 25, 2001, now abandoned.

(51) Int. Cl.
*G06F 15/16* (2006.01)
(52) U.S. Cl. ............. 709/218; 709/225; 709/229; 726/3
(58) Field of Classification Search .......... None
See application file for complete search history.

(56) References Cited

U.S. PATENT DOCUMENTS

| | | | |
|---|---|---|---|
| 5,317,568 A | 5/1994 | Bixby et al. | |
| 6,055,564 A | 4/2000 | Phaal | |
| 7,472,159 B2 * | 12/2008 | Freimuth et al. | 709/217 |
| 7,698,402 B2 * | 4/2010 | Santos et al. | 709/223 |
| 7,743,147 B2 * | 6/2010 | Suorsa et al. | 709/226 |
| 7,783,610 B2 * | 8/2010 | Lin et al. | 709/219 |
| 7,788,357 B2 * | 8/2010 | Riley et al. | 709/223 |
| 2006/0047829 A1 * | 3/2006 | Acharya et al. | 709/229 |

FOREIGN PATENT DOCUMENTS

| | | | |
|---|---|---|---|
| EP | 1672532 A1 * | 6/2006 | |
| JP | 2002202951 A * | 7/2002 | |

OTHER PUBLICATIONS

Ramachandran, Muthu et al. "Knowledge Based Reasoning for Software Architectural Design Strategies." ACM Software Engineering Notes. May 2004. vol. 29, No. 4. ACM Press. 4 pages.*
Chen, Liang et al. "Resource Allocation in a Middleware for Streaming Data." Middleware 2004 Companion. 2nd workshop on Middleware for Grid Computing. ACM Press. Oct. 2004. 5-10.*
"Multi-tier Management Extensions for Event Relationship." IBM Technical Disclosure Bulletin. Feb. 1, 2002. Issue 454, p. 315. UK. 4 pages.*

* cited by examiner

*Primary Examiner* — Jeffrey R Swearingen (57) ABSTRACT

An e-commerce web site has an application tier and a web tier, each with multiple servers. The application tier runs the resource-intensive functions germane to the site's purpose; while the web tier provides the primary interface for clients. The web tier implements admission control so that some requests can be deferred during periods of heavy traffic. In addition, the web tier can request additional web-tier and application-tier resources when they can be added cost effectively. The application tier monitors its own resource utilization and communicates resource-utilization data to the web tier. The web tier uses this application-tier resource-utilization data to determine its deferral criteria. In addition, the web-tier can monitor its own resource utilization and take the results into account in determining the deferral criteria. By monitoring application-tier utilization at the application tier rather than remotely at the web tier, more accurate and more flexible information is obtained, allowing for a better-optimized deferral scheme.

11 Claims, 4 Drawing Sheets

TIERED WEB SITE WITH WEB-TIER ADMISSION CONTROL BASED ON UTILIZATION DATA GENERATED ON APPLICATION TIER

This is a continuation-in-part of U.S. patent application Ser. No. 09/916,101 filed Jul. 25, 2001, now abandoned, which is incorporated herein in its entirety by reference.

BACKGROUND OF THE INVENTION

The present invention relates to computers and, more particularly, to "host" computer networks that respond to requests from external "client" computers. A major objective of the present invention is to enhance the quality of service associated with a host site on the World Wide Web.

Much of modern progress is associated with the development of computers and the Internet, which permits computers to communicate worldwide. Several protocols exist by which a host site, which may comprise one or more "server" computers, receives and processes messages from a number of other computers ("clients"). For example, HTTP (HyperText Transfer Protocol) is a communications protocol used on the World Wide Web to enable users to navigate within and among host sites.

Messages can usually be grouped into sessions, with each session having one or more related messages. For example, a session can consist of a message requesting information over the World Wide Web, and an associated response. Alternatively, a multiple-message session can consist of a commercial transaction, with related messages respectively used to locate within a web site a precise product, submit an order or billing and shipping information, and convey a confirmation of sale to a particular client. Whether a host is to process just a single message or a series of related messages, it is usually important to quickly, accurately, and completely service each message and each session.

The term "quality of service" refers to a host's ability to respond quickly to individual messages and to complete sessions. As a particular host becomes more popular, and therefore receives more messages, the host's processing resources can become stretched. For example, due to heavy traffic, a host may not be able to respond to a message at all, or the host may not provide a timely response (which can cause a client to "time-out" with an error or the impatient user to resend the message). Poor quality of service can have significant impact, as users may become frustrated and simply give up trying to reach a particular host, and the sponsor of the host may lose sales or fail to communicate needed information to some clients.

Quality of service can be improved by adding processing capacity and by implementing admissions control. Different approaches to increasing capacity are discussed further below. In many cases, it is cost effective to provide sufficient capacity to handle all messages most of the time, while relying on admissions control for peak demand situations. Even where additional hardware resources can be added on demand, peak usage can occur too suddenly for the additional capacity to be operational; the time from the spike being identified to the time additional capacity is available can be hours to days for manual operations and many minutes to hours for automatic or semi-automatic operations. During this time, admission control is often the best alternative to handling an immediate spike in usage, especially when the spike is short lived and far higher than the site's demand growth trend.

Admissions control involves selectively admitting and rejecting messages so that the messages that are processed are handled promptly and reliably. Intelligent admissions control can prioritize messages to advance the purposes of the host site. For example, messages associated with ongoing sessions can be given priority. U.S. Pat. No. 6,006,269 to Phaal discloses a system in which admission determinations are made on a session basis and in which non-admitted messages are deferred with a higher priority level rather than rejected outright. Thus, opportunities associated with non-admitted messages are not necessarily lost.

Preferably, the admissions decisions are based on utilization data gathered by the host site. All messages can be admitted when resource utilization is low. As it increases to potentially problematic levels, admissions can become increasing selective. However, since there is a potential detriment to the site whenever admissions control rejects or defers a message, admission control is not desirable on a steady-state basis. It is preferable that host-site capacity be able to process all messages most of the time In general, quality of service can be improved by adding processing power to the host site. For example, in a single-server site, a less powerful server can be replaced with a more powerful server. An advantage of the single-server replacement approach is simplicity. A single computer handles all site functions. Programs running on that computer can handle message, monitor resources, and administer admissions control.

On the other hand, there are limits to the single-server approach. At the high end, where the limits of available technology are pushed, fractional increases in power are quite costly. Furthermore, when the single server is down, the entire site is down. Also, a replacement strategy can be wasteful if the replaced server is no longer used. In practice, most large sites use multiple servers.

Similarly configured severs can be arranged in parallel. Servers can be added in parallel as needed to increase capacity. A load-balancing mechanism can be added at the front end to distribute messages among the parallel servers. However, the parallel servers need to be coordinated to ensure session integrity. Also, while admissions control can be done independently by each server, this results in messages being rejected by one server while there is ample capacity on another. It is not practical for the parallel servers to communicate with each other regarding each client request. While the coordination can, in principle, be performed at the load balancer, imposing additional processing requirements on the common node for all messages can result in an unacceptable performance bottleneck.

A tiered host site overcomes many of the problems facing a multi-server host site. A typical tiered host site has a client-response tier (e.g., web tier using HTTP protocol) and an application tier. (Conventionally, the client computers constitute a tier; thus, a two-tier host site would imply a three-tier system.) The application tier performs most of the resource-intensive work regarding the purpose of the site, while client-response tier typically provides the client interface. For example, the client-response tier can provide a web interface for a client, while the application tier handles e-commerce (electronic commerce) applications and maintains a database accessed by the applications. The application tier can manage sessions, tagging responses so that subsequent messages in the session can be identified as such. The client-response tier can use the session tags to generate cookies and/or links associated with session-specific URLs to direct subsequent client requests to the proper application server.

Each tier can be expanded independently as required. Since the client-response tier manages the distribution of messages to the application tier, application tier servers can be differentiated by function. Capacity can be increased by activating (adding, turning on, or re-allocating) a server dedicated to the stressed function so that the additional resources are not wasted on underutilized applications.

The client-response tier can utilize parallel similarly configured servers. Coordination among the parallel servers is facilitated by the session tags added by the application tier. Expansion of the client-tier capacity is then readily achieved by adding additional servers in parallel. Alternatively, the client-response tier can be configured as a load-balancing hub supported by other servers dedicated to specific client-response functions, such as encryption and decryption. While the hub approach does place additional burdens on the common-node load balancer, session tracking is still managed primarily at the application tier. A hubbed client-response tier can be expanded efficiently by adding servers dedicated to a specific function that is over utilized.

In a tiered site, the admissions control function is typically assigned to the client-response tier since it provides the front-end interface to the client computer. The admission control function can monitor local resource utilization effectively on a per-server basis. The admission control function on the client-response tier can monitor response times associated with requests to the application tier as a measure of its resource utilization. The resource utilization information about the client-response tier and the application tier then is used to determine the admissions control policy at any given time.

While the tiered host site approache provides for efficient scaling and for effective admissions control, there is an insatiable demand for better performance. In particular, there is a demand for better admission control, since it is a software component that can, in principle, be upgraded less expensively than the host site hardware. What is needed is more effective admission control for a tiered host site.

SUMMARY OF THE INVENTION

The present invention provides a network host site in which admission control determinations are made on a client-response tier using resource utilization data collected on an application tier. The invention further provides for admissions-control determinations that are also made as a function of resource-utilization data collected on the client-response tier. In addition to being used for admissions determinations, the resource utilization data can be used to request an increase or decrease of active server resources.

The host site has distinct client-response and application tiers in that each host-site server is assigned to at most one of the tiers. Servers that only handle client interfacing are assigned to the client-response tier, while servers that run non-interfacing applications but do not handle client interfacing are assigned to the application tier. Servers that handle both non-interfacing applications and client interfacing are assigned to the client-response tier.

The invention provides for a variety of tier configurations. The client-response tier can be configured as a single server, as a set of parallel servers with a load-balancing front end, or as a set of specialized servers managed by a routing hub. The application tier can have sub-tiers; for example, specialized application servers can be serviced by one or more database servers on a back end. Alternatively, the application tier can be arranged around a routing hub.

While application-tier performance can be assessed by the client-response tier, local application-tier resource monitoring has several advantages. First, the application server as a whole can be measured independently of the network and even other servers (such as the database). Also it allows for a disaggregated measure of an application's performance by resource components (for example, memory, CPU, I/O). Moreover, it allows each application to associate measurements with its own admissions classes and base them on session or even client identity.

Finally, resource monitoring can be customized on a per-server basis. Where multiple applications are running on the same server, customization can be implemented on a per-application basis. This allows for better optimization of application resources. For example, the application tier can generate resource utilization data in XML ("Extensible Markup Language") format with instructions to the client-response tier regarding interpretation and usage of the application-tier resource utilization data. These and other features and advantages of the present invention are apparent from the description below with reference to the following drawings.

DESCRIPTION OF THE PREFERRED EMBODIMENTS

Figure 1:
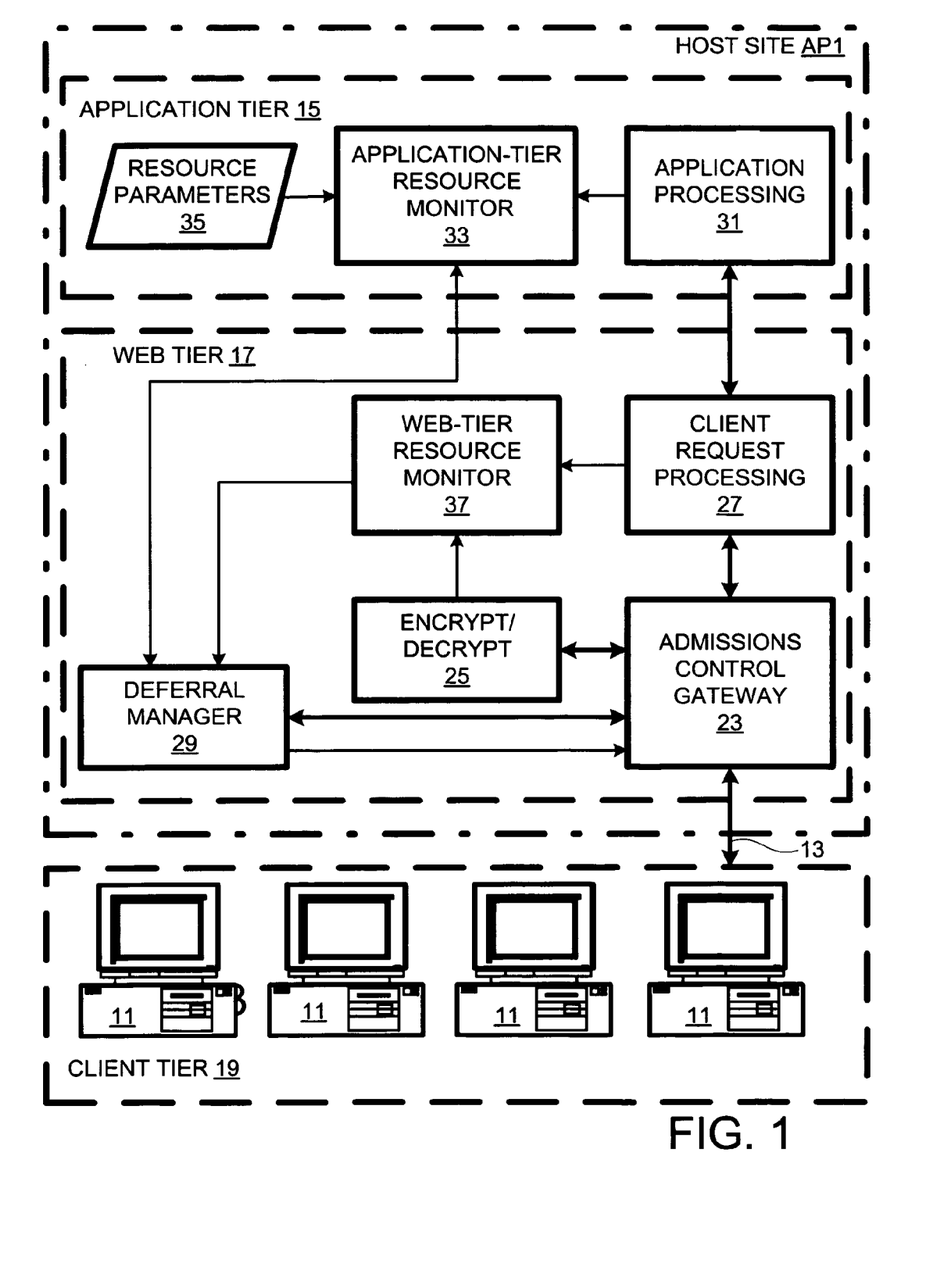
FIG. 1 is a schematic diagram of a host site with parallel client-response-tier servers and connected to multiple clients in accordance with the present invention.

In accordance with the present invention, a host site AP1 communicates with client computers 11 over the Internet, indicated by a connection 13, as shown in FIG. 1. In this case, host site AP1 is an e-commerce site, and more specifically a flight-scheduling and reservation-handling site. More generally, the invention provides for host sites with a wide range of purposes. The host site is divisible into an application tier 15 and a web tier 17. In FIG. 1, client computers are depicted as part of a client tier 19. This is a conceptualization from the perspective of the host site and does not simply any special relationship among the client computers other than the ability to communicate with host site AP1.

Figure 2:
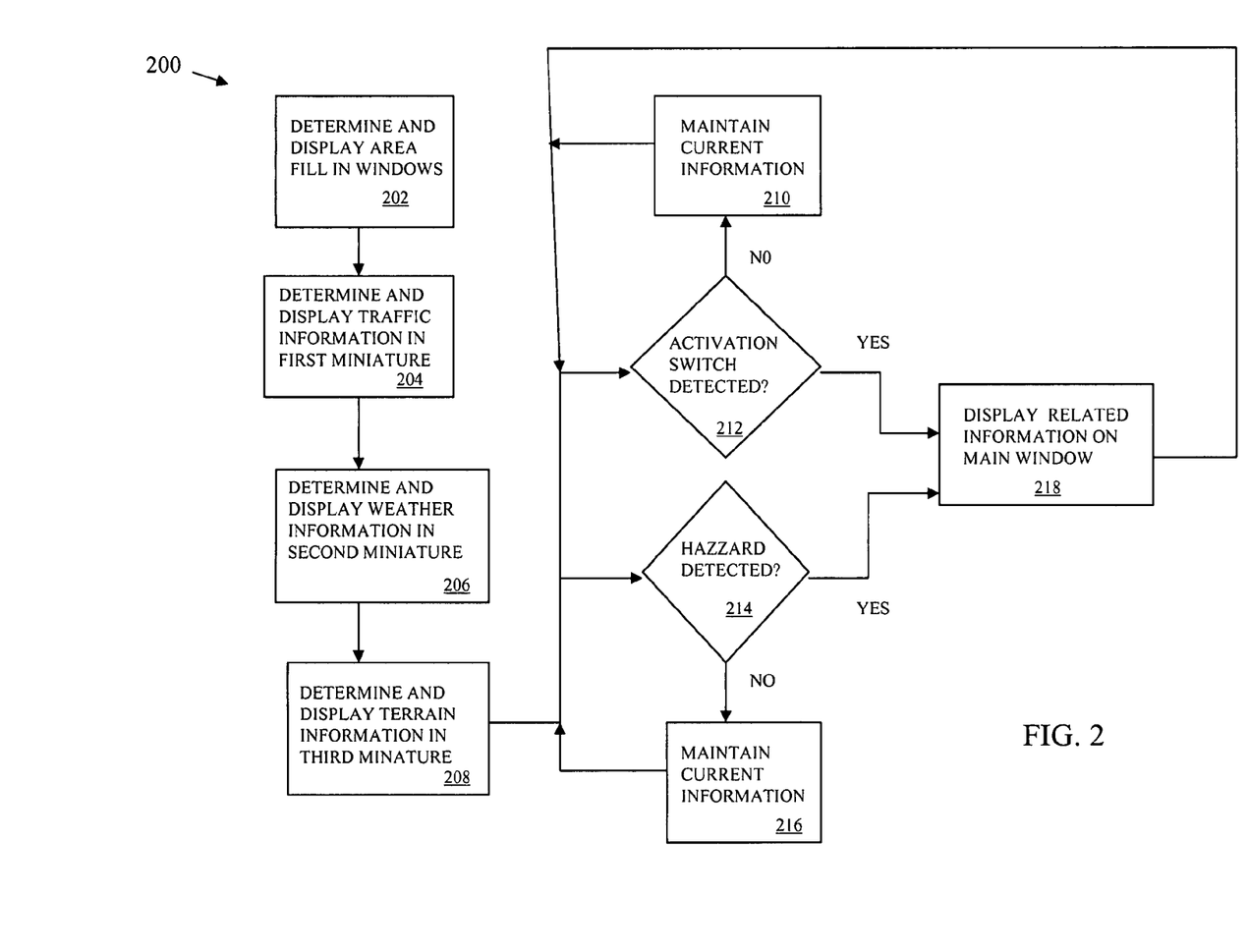
FIG. 2 is a schematic diagram of the host site of FIG. 1 indicating internal communications paths and scalability options.

The host-site hardware is shown in greater detail in FIG. 2. Web tier 17 has three active servers WS1, WS2, WS3, and a load balancer 21. In periods of high demand, host site AP1 can activate up to three additional servers WS4, WS5, and WS6. Application tier 15 includes a database server AS1 and two front-end application servers AS2 and AS3, while an additional application server AS4 can be activated when additional resources are required. Servers WS4, WS5, WS6, and AS4 are normally inactive or used elsewhere in order to save costs. The relatively greater expandability of the web tier (indicated by having three servers in reserve versus one for the application tier) corresponds to the greater computing power and state maintenance normally required of the application servers, and thus the greater expense involved in adding servers to the application tier.

Application-tier servers, may, but need not, run the same software. For example, application server AS1 runs a database program that organizes information regarding flight schedules. Application server AS2 runs a flight scheduling application, while application server AS3 runs a flight reservation application. In times of high demand, application server AS4 can provide additional capacity for the flight-reservation function. Moreover, each application server can run multiple applications, some of which may run on only one application server, some of which may run on all application servers, and some of which may run on more than one but not all application servers. However, the application servers do not run the web-serving applications that interface directly with client tier 19.

Web servers WS1, WS2, and WS3, as well as the other web servers when active, run respective copies of the same software. Each runs a web serving application that provides the main interface to browsers running on client computers 11. Load balancer 21 distributes client requests in round-robin fashion to the active web servers. In addition, each server can run one or more application programs other than web servers. However, the more complex application programs are run on the application-tier servers.

The common functions of servers on web tier 17 are shown in FIG. 1. Client requests are received at an admission control gateway 23. Gateway 23 initially determines whether or not the request is encrypted. If it is, it is decrypted at encrypt/decrypt function 25. Once the request is decrypted or if it was not encrypted, admission control gateway 23 determines whether to pass it on to (software) client-request processor 27, or to deferral manager 29. The decision is made as a function of the programming of admission control gateway 23 by deferral manager 29.

In the event the request is passed to it, client-request processor 27 determines whether it can respond to the request using local (web-tier-server) resources, or whether it needs to forward the request to application tier 15. In the former case, a client response can be generated in accordance with the client browser protocol (e.g., HTTP). The client response is passed to admissions control gateway 23. If encryption is required, admissions control gateway 23 passes the client-response to encrypt/decrypt function 25 and forwards the encrypted result to the client that made the request.

If the client request cannot be met locally, client-request processor 27 formulates an application request for an application processor 31 in the form of software running on application tier 15. Since not all servers of application tier 15 run the same applications, client-request processor 27 must direct the application request to the appropriate server and application. If that target application is running on more than one application-tier server, client-request processor 27 must determine which of those servers to direct the application request to. Generally, requests associated with the same session are directed to the same application server. Otherwise, a selection can be made based on unused capacity, or more simply on a round-robin basis.

Some application requests can require processing on more than one server. For example, a request for flight-schedule information may require a flight-schedule application on server AS2 (FIG. 2) to access database server AS1. However many application servers are involved, an application response is generated at application tier 15 in response to the application request. The application tier can tag the application response with session identification information so that subsequent client requests in the same session can be correlated.

The application response is forwarded from application processor 31 to the client-request processor 25. Typically, the application response is transmitted to the web-tier server that generated the corresponding application request. Alternatively, the selection of web-tier server for the application response can be selected on some other basis, e.g., round robin. Once client-request processor 27 receives an application response, it generates a client response, treating it in the manner described above for locally answered client requests.

Client-request processor 27 can use the session identification information to generate a cookie or a unique URL. This URL can be communicated in the form of a web page link that generates a new client request with the session information embedded. This enables a web-tier server to route a subsequent message in a session to the appropriate application-tier server.

Each application-tier server has a resource monitor 33. The parameters 35 to be monitored can be selected, but typically CPU usage is one parameter that is monitored. The parameter values determined through this monitoring are forwarded from the resource monitor to the deferral manager 29. The resource monitor 33 of each application server forwards this data to every web-tier deferral manager 29. The deferral manager 29 uses this information to determine the response of gateway 23 to client requests.

Concurrently, the resource parameters associated with the web tier can be monitored. To this end, a web-tier resource monitor 37 on each web-tier server monitors usage including client-request processing and encryption and decryption activity. Note, the web-tier resource utilization data for each web-tier server can be provided to load balancer 21 (FIG. 2) so that it can take web server utilization data into account when distributing client requests.

Depending on the programming, deferral manager 29 can command gateway 23, in the alternative to admit all requests, admit no requests, admit only requests associated with ongoing sessions, or admit requests according to some more complex criteria. Non-admitted requests can be forwarded to the deferral manager. The deferral manager can assign a time for a client to resubmit the request. The deferral message is tagged so that a request in compliance with the deferral message is given preferential treatment at gateway 23. For example, resubmitted requests can be admitted while new requests are deferred. The deferral time can be set as a function of resource utilization. In addition to controlling admission criteria, the deferral manager can send a request to a resource manager on the application tier to increase (or decrease) available resources.

Figure 3:
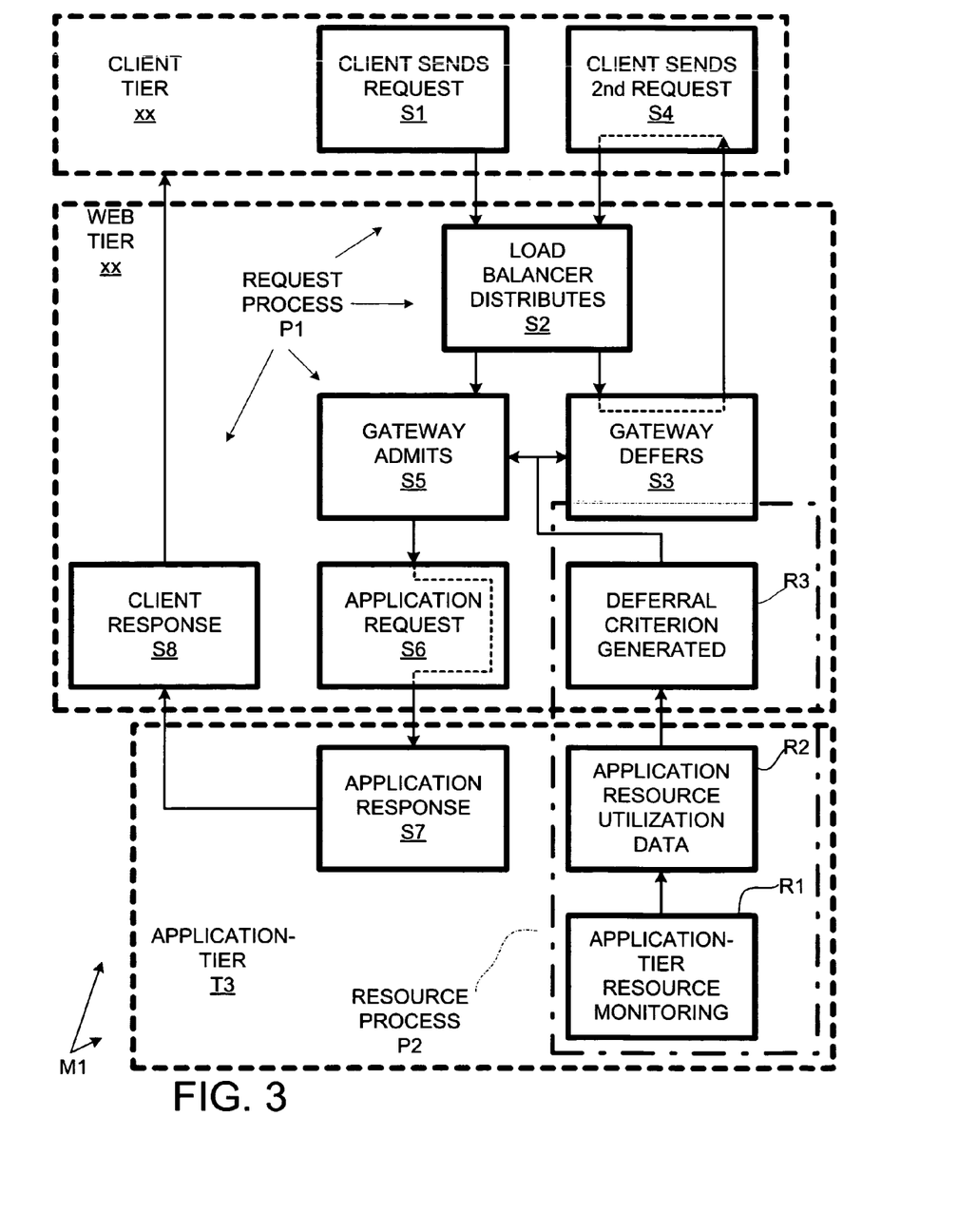
FIG. 3 is a flow chart of a method of the invention implemented on the host site of FIG. 1.

A method M1 of the invention practiced in the context of host site AP1 is flow charted in FIG. 3. Method M1 includes two processes, a request-handling process P1 and a resource-utilization process P2. Request-handling process involves client tier 19, and the two host-site tiers: web tier 17, and application tier 15.

An illustrative sequence for request process P1 begins with a client sending a request at step S1. Load balancer 21 (FIG. 2) receives this request and allots it on a round robin basis, taking into account web-tier resource-utilization data, at step S2 to a web-tier server, e.g., server WS1. The gateway for the receiving server can either admit or defer this request. In this illustrative sequence, the request is deferred at step S3. In this case, deferral manager 29 generates and transmits to the client a deferral message indicating when the client can resubmit the request.

The client resubmits the request by clicking a link in the deferral message at step S4. Load balancer distributes this $2^{nd}$ request to a web-tier server at a second iteration of step S2. In general, the deferred request is admitted at step S5.

Unless the client-request processor of the web-tier can respond on its own, it generates an application request and transmits it to the application tier at step S6. Each web-tier server knows which applications run on which application-tier severs, so the request is directed to an appropriate application-tier server. The receiving server generates an application response at step S7. The receiving server may access other application tier servers, including a database server, as necessary to formulate this application response. The application tier can tag the application response with session-identification information to keep track of sessions. Finally, the client-request processor generates a client response, using the session identification to generate a cookie or a unique URL that can be used in routing subsequent messages in a session.

The client response S8 may result is a further client request. Assuming this is a continuation of a session, the session is identified in the new request. This session information is ignored by the load balancer, but used by the selected web-tier server to direct a new application request to the appropriate application tier server.

Resource process P2 is concurrent with multiple iterations of steps S1-S8. At step R1, application tier resources are monitored at the application tier. For example, each application tier server can monitor its own resources. The monitor generates usage data at step R2. This data is transferred to the web tier and used to generate deferral criteria at step R3. The deferral criteria are used at the web tier to determine which requests are admitted (at step S5) and which steps are deferred (at step R3).

In host site AP1, the web tier is arranged with servers operating in parallel. The invention provides for alternatives to the parallel web-tier arrangement. For example, the web tier can be implemented on a single server. Furthermore, a multi-server web tier can differentiate servers by function, for example, as in system AP2 of FIG. 4.

Figure 4:
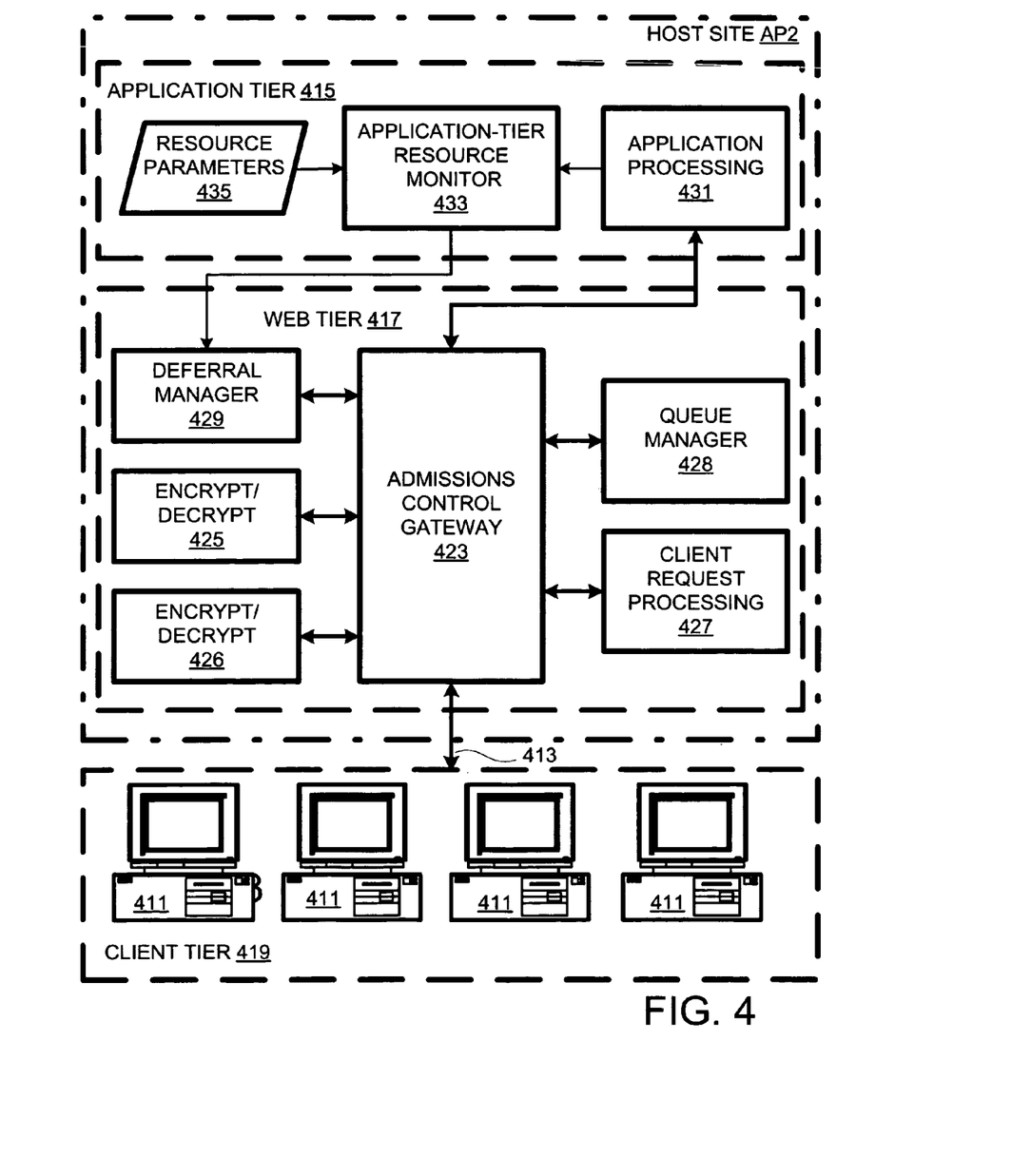
FIG. 4 is a schematic diagram of a host site with a hub-based client-response tier and connected to multiple clients in accordance with the present invention.

Host-site AP2 interfaces with a client tier 419, which includes a number of client computers 411. Host-site AP2 includes an application tier 415 and a web tier 417. Application tier 415, which is similar to application tier 15 of host site AP1, includes an application processing function 431, an application-tier resource monitor 433, and resource parameters 435. However, web tier 417 of host site AP2 is quite distinct from the parallel arrangement of web tier 17 of host site AP1.

Web tier 417 comprises six servers 423, 425, 426, 427, 428, and 429. Servers 423, 425, 427 and 429 are dedicated to specific functions that were shared by all servers in web tier 17 of host site AP1. Server 426 provides additional processing for the encryption/decryption function. Queue manager server 428 adds a function of queuing client and application requests for serial routing by admissions control gateway 423.

Admission control gateway 423 of FIG. 4 performs the function of admission control gateway 23 and the load-balancing function of load balancer 21 of FIG. 2. It essentially acts as the load-balancing hub for web tier 417. It determines whether encryption or decryption is required and directs messages to one of the encryption/decryption servers 425, 426, as required. It implements deferral policy as directed by deferral manager server 429. It directs appropriate client requests to client-request processor 427. Client and application requests are referred to queue manager server 428 for ordered processing. The one function that is not routed through gateway 423 is the resource monitoring function, in which resource utilization data is transmitted directly to deferral manager server 429.

An advantage to the web-tier hub approach of host site AP2 is that scaling can be done function by function, as it has been with encryption and decryption. Functions that are not heavily utilized need not be expanded to new servers. On the other hand, functions can be combined on a server to avoid underutilization of hardware.

The present invention has applicability to network communications and e-commerce. The invention is scaleable to any number of servers and provides for a wide variety of tier architectures with varying numbers of subtiers. These and other modifications to and variations upon the present invention are provided for by the present invention, the scope of which is defined by the following claims.

What is claimed is:

1. A host site comprising:
an application tier including an application-tier set of servers that generates application-tier resource utilization data said application tier having an application processing function running on said server for responding to said application requests with said application responses, said application tier having a resource monitor for generating said application-tier resource-utilization data by monitoring utilization parameters on said server, said resource monitor communicating said application-tier resource-utilization data to said deferral manager; and
a client-response tier including a client-response-tier set of servers, said client-response-tier set and said application-tier set being mutually exclusive, said client-response-tier having a client-response-tier resource monitor for generating client-response-tier resource utilization data as a function of parameters associated with said client-response-tier server, said client-response-tier set performing admission control using said application-tier resource utilization data, said servers on said client-response tier and said servers on said application tier including central processing units (CPUs) and memory.

2. A host site as recited in claim 1 wherein:
said client-response tier has
an admissions control gateway for receiving client requests from client computers;
a deferral manager for making determinations concerning which of said client requests should be admitted for processing and which should be deferred at least in part as a function of said application-tier resource-utilization data;
a client-request processor for processing client requests admitted for processing, said client-request processor generating application requests in response to at least some of said client requests, said client-request processor generating client responses in response to application responses received in response to said application requests.

3. A host site as recited in claim 2 wherein said client-request processor transmits said client responses to said client computers in accordance with an http protocol.

4. A host site as recited in claim 2 wherein said client-response tier includes at least one client-response-tier server on which said deferral manager and said client-request processor run, said client-response-tier resource monitor providing said client-response-tier resource utilization data to said deferral manager, said deferral manager making said determinations in part as a function of said client-response-tier resource utilization data.

5. A host site as recited in claim 4 wherein said deferral manager also generates requests to expand the processing capacity on said client-response tier.

6. A host site as recited in claim 2 wherein said deferral manager generates requests to expand the processing capacity on said application tier.

7. A host site as recited in claim 6 wherein said processing capacity is expanded by one or more of the following: increasing the number of servers, increasing the number of CPUs, increasing CPU entitlement.

8. A network hosting method for a host site having an application tier and a client-response tier with mutually exclusive sets of servers including CPUs and memory, said method comprising a client-response process and a resource-monitoring process, said resource-monitoring process involving
- a1) monitoring resource utilization at said application tier,
- a2) generating application-tier resource-utilization data at said application tier and transmitting said application-tier resource-utilization data to said client-response tier, and
- a3) monitoring resource utilization at said client-response tier so as to generate client-response-tier resource-utilization data, and said request processing involving
- b1) receiving at said client-response-tier a client request from a client via a network,
- b2) making an admissions determination at said client-response tier whether said client request should be admitted immediately or deferred, said determination being made at least in part as a function of said application-tier resource-utilization data and said client-response-tier resource-utilization data,
- b3) when said client request is admitted, sending an application request from said client-response tier to said application tier,
- b4) generating an application response at said application tier and transmitting said application response to said client-response tier, and
- b5) generating a client response as a function of said application response and transmitting said client response to said client via said network.

9. A method as recited in claim 8 wherein at step b2) in the event a determination is made to defer admission of said client request, a notification is sent to said client to that effect via said network.

10. A method as recited in claim 8 wherein at step b2, in the event a determination is made to defer admission, a request is generated to increase the processing capacity on said application tier.

11. A host site method comprising:
generating application-tier resource-utilization data on an application tier having an application-tier set of servers;
generating client-response tier resource-utilization data on a client-response tier having a client-response set of servers, said client response set and said application-tier set being mutually exclusive: and
using said application-tier resource utilization data and said client-response-tier utilization data on said client-response tier to determine admission-control policy.

* * * * *

UNITED STATES PATENT AND TRADEMARK OFFICE
CERTIFICATE OF CORRECTION

PATENT NO. : 8,005,926 B2  
APPLICATION NO. : 11/169971  
DATED : August 23, 2011  
INVENTOR(S) : Arthur S. Harkin et al.

Page 1 of 1

It is certified that error appears in the above-identified patent and that said Letters Patent is hereby corrected as shown below:

In column 10, line 28, in Claim 11, delete "exclusive:" and insert -- exclusive; --, therefor.

Signed and Sealed this
Eighth Day of May, 2012

David J. Kappos
*Director of the United States Patent and Trademark Office*